(12) United States Patent
Muramatsu

(10) Patent No.: US 10,870,386 B2
(45) Date of Patent: Dec. 22, 2020

(54) VEHICLE LAMP

(71) Applicant: STANLEY ELECTRIC CO., LTD., Tokyo (JP)

(72) Inventor: Naoki Muramatsu, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 17 days.

(21) Appl. No.: 16/351,246

(22) Filed: Mar. 12, 2019

(65) Prior Publication Data

US 2019/0275924 A1    Sep. 12, 2019

(30) Foreign Application Priority Data

Mar. 12, 2018 (JP) ................. 2018-044529

(51) Int. Cl.
*B60Q 1/14* (2006.01)

(52) U.S. Cl.
CPC .......... *B60Q 1/1438* (2013.01); *B60Q 1/143* (2013.01); *B60Q 2300/056* (2013.01); *B60Q 2300/41* (2013.01); *B60Q 2300/42* (2013.01)

(58) Field of Classification Search
CPC .......... B60Q 2300/056; B60Q 2300/42; B60Q 1/1438
See application file for complete search history.

(56) References Cited

U.S. PATENT DOCUMENTS

| 2013/0242100 A1 | 9/2013 | Seki |
| 2016/0152174 A1* | 6/2016 | Hagisato ............... B60Q 1/143 362/466 |

FOREIGN PATENT DOCUMENTS

| DE | 10 2008 025 808 A1 | 12/2009 |
| FR | 3031480 A1 | 7/2016 |
| JP | 2013-184595 A | 9/2013 |
| JP | 2015-058802 A | 3/2015 |
| JP | 2016-027977 A | 2/2016 |

OTHER PUBLICATIONS

Extended European Search Report for the related European Patent Application No. 19162043.4 dated Jul. 23, 2019.

* cited by examiner

*Primary Examiner* — Joseph L Williams
*Assistant Examiner* — Jacob R Stern
(74) *Attorney, Agent, or Firm* — Kenealy Vaidya LLP

(57) ABSTRACT

A vehicle lamp comprising: mask-object detecting means that detects a mask-object to be masked ahead of a self-vehicle; prediction means that predicts a position of the mask-object detected by the mask-object detecting means; and a lamp unit that forms, a light distribution pattern including a non-illumination region that does not illuminate the mask-object positioned at the position predicted by the prediction means, wherein the position of the mask-object predicted by the prediction means is a position of the mask-object after the lapse of the predetermined time.

13 Claims, 6 Drawing Sheets

VEHICLE LAMP

CROSS-REFERENCE TO RELATED APPLICATION

This application is based upon and claims the benefit of priority of the prior Japanese Patent Application No. 2018-044529, filed on Mar. 12, 2018 the entire contents of which are incorporated herein by reference.

FIELD

The present invention relates to a vehicle lamp, and more particularly to a vehicle lamp that can suppress glare to a mask-object to be masked even when the relative position of the mask-object to a self-vehicle rapidly changes.

BACKGROUND

In the field of vehicle lamps, there has been conventionally known an adaptive driving beam vehicle lamp capable of: detecting the position (e.g., the right angle and the left angle) of a mask-object (e.g., a preceding vehicle and/or an oncoming vehicle) to be masked; setting, on the basis of the detected position of the mask-object, a non-illumination region that does not illuminate such a mask-object; and forming, in a high-beam region, a light distribution pattern including the set non-illumination region and an illumination region that illuminates a region other than the non-illumination region (see Patent Literature 1, for example).

Patent Literature 1: Japanese Laid-open Patent Publication No. 2015-058802

SUMMARY

In the aforementioned adaptive driving beam vehicle lamp, however, a certain amount of time is required to detect the position of the mask-object, set the non-illumination region on the basis of the detected position of the mask-object, and the like. Thus, when the relative position of the mask-object to a self-vehicle rapidly changes, as in a case where a preceding vehicle which is a mask-object rapidly turns (turns right or left) or an oncoming vehicle which is a mask-object rapidly approaches the self-vehicle, the mask-object disadvantageously enters the illumination region beyond the set non-illumination region, thereby being exposed to glare.

The present invention has been made in view of the aforementioned circumstances, and it is an object of the present invention to provide a vehicle lamp that can suppress glare to a mask-object to be masked even when the relative position of the mask-object to a self-vehicle rapidly changes.

In order to achieve the above object, one aspect of the present invention provides a vehicular lamp including: mask-object detecting means that detects a mask-object to be masked ahead of a self-vehicle; prediction means that predicts a position of the mask-object detected by the mask-object detecting means; and a lamp unit that forms, a light distribution pattern including a non-illumination region that does not illuminate the mask-object positioned at the position predicted by the prediction means, wherein the position of the mask-object predicted by the prediction means is a position of the mask-object after the lapse of the predetermined time.

According to this aspect, glare to the mask-object can be suppressed even when the relative position of the mask-object to the self-vehicle rapidly changes as in the case where the preceding vehicle which is a mask-object rapidly turns (turns right or left) or the oncoming vehicle which is a mask-object rapidly approaches the self-vehicle.

This can be achieved by predicting the position of a mask-object after the lapse of the predetermined time, setting a non-illumination region that does not illuminate the mask-object positioned at the predicted position, and forming, in a high-beam region, a light distribution pattern including the set non-illumination region and an illumination region that illuminates a region other than the non-illumination region.

Further, in a preferred embodiment of the present invention, the vehicle lamp includes: non-illumination region setting means that sets, on a basis of the position predicted by the prediction means, the non-illumination region; and lamp unit controlling means that controls the lamp unit, wherein the lamp unit controlling means controls the lamp unit to form, the light distribution pattern including the non-illumination region set by the non-illumination region setting means.

Further, in a preferred embodiment of the present invention, the vehicle lamp includes: angle detecting means that detects an angle of the mask-object detected by the mask-object detecting means with respect to the self-vehicle, wherein the prediction means predicts, on a basis of the angle detected by the angle detecting means, the position of the mask-object detected by the mask-object detecting means.

Further, in a preferred embodiment of the present invention, the vehicle lamp includes: difference calculating means that calculates a difference between the angles detected by the angle detecting means; average moving amount calculating means that calculates, on a basis of the difference calculated by the difference calculating means, an average moving amount of the mask-object detected by the mask-object detecting means; and correction value calculating means that calculates a correction value by multiplying the average moving amount of the mask-object calculated by the average moving amount calculating means, by a coefficient, wherein the prediction means adds the angle detected by the angle detecting means and the correction value calculated by the correction value calculating means to predict the position of the object detected by the mask-object detecting means.

Further, in a preferred embodiment of the present invention, the angle detecting means detects a right angle and a left angle of the mask-object detected by the mask-object detecting means with respect to the self-vehicle; the difference calculating means calculates a difference in a larger one of the right angle and the left angle detected by the angle detecting means; and the prediction means adds the larger one of the right angle and the left angle detected by the angle detecting means and the correction value calculated by the correction value calculating means to predict the position of the object detected by the mask-object detecting means.

Further, in a preferred embodiment of the present invention, when N differences are calculated by the difference calculating means, the average moving amount calculating means divides a sum of the N differences by the N to calculate the average moving amount of the mask-object.

Further, in a preferred embodiment of the present invention, when differences the number of which is less than N are calculated by the difference calculating means, the average moving amount calculating means divides a sum of the differences, the number of which is less than N, by the N to calculate the average moving amount of the mask-object.

Further, in a preferred embodiment of the present invention, when a change in relative position of the mask-object detected by the mask-object detecting means to the self-vehicle exceeds a threshold, the non-illumination region setting means sets the non-illumination region that does not illuminate the mask-object positioned at the position predicted by the prediction means, and when a change in relative position of the mask-object detected by the mask-object detecting means to self-vehicle does not exceed the threshold, the non-illumination region setting means sets the non-illumination region that does not illuminate the mask-object positioned at the position detected by the angle detecting means.

DESCRIPTION OF EMBODIMENTS

Hereinafter, a vehicle lamp 10 that represents an embodiment of the present invention will be described with reference to the accompanying drawings. It should be noted that corresponding components in the respective drawings will be denoted by same reference signs and redundant descriptions thereof will be omitted.

Figure 1:
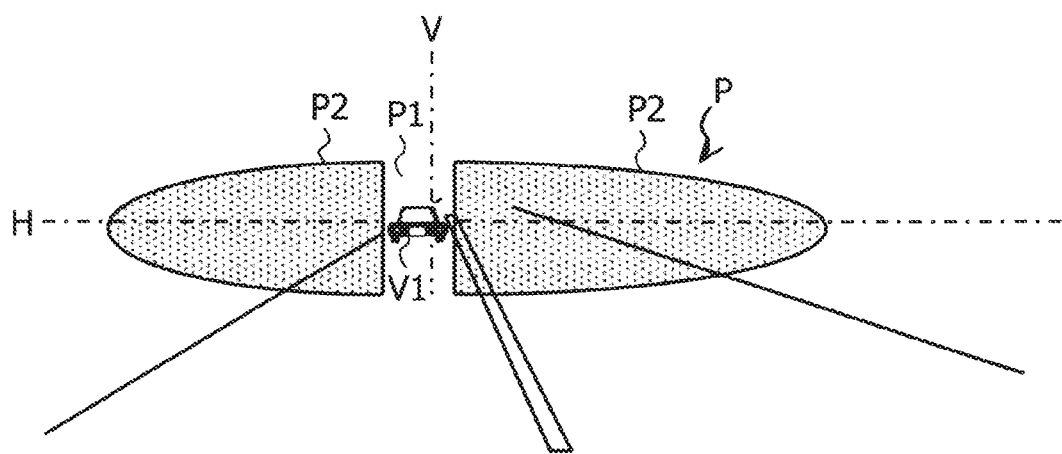
FIG. 1 shows an example of a light distribution pattern P formed by a vehicle lamp 10.

FIG. 1 shows an example of a light distribution pattern P formed by a vehicle lamp 10. FIG. 1 shows an example of the light distribution pattern P formed on a virtual vertical screen (disposed about 25 m forward of the front of a vehicle (self-vehicle)) directly facing the front of the vehicle.

As shown in FIG. 1, the vehicle lamp 10 of the present embodiment is an adaptive driving beam (ADB) vehicle headlamp capable of forming, in a high-beam region, the light distribution pattern P including a non-illumination region P1 that does not illuminate a mask-object V1 to be masked and an illumination region P2 that illuminates a region other than the non-illumination region P1. For example, the vehicle lamp 10 is installed on either side of a front end of a vehicle such as an automobile. Note that the non-illumination region P1 is a dark region (a dimmed region or an unlighted region) as compared to the illumination region P2.

While not shown in the figures, the vehicle lamp 10 is disposed in a lamp chamber configured by an outer lens and a housing, and attached to the housing, for example. Hereinafter, a vehicle on which the vehicle lamp 10 is installed is referred to as a self-vehicle V0.

Figure 2:
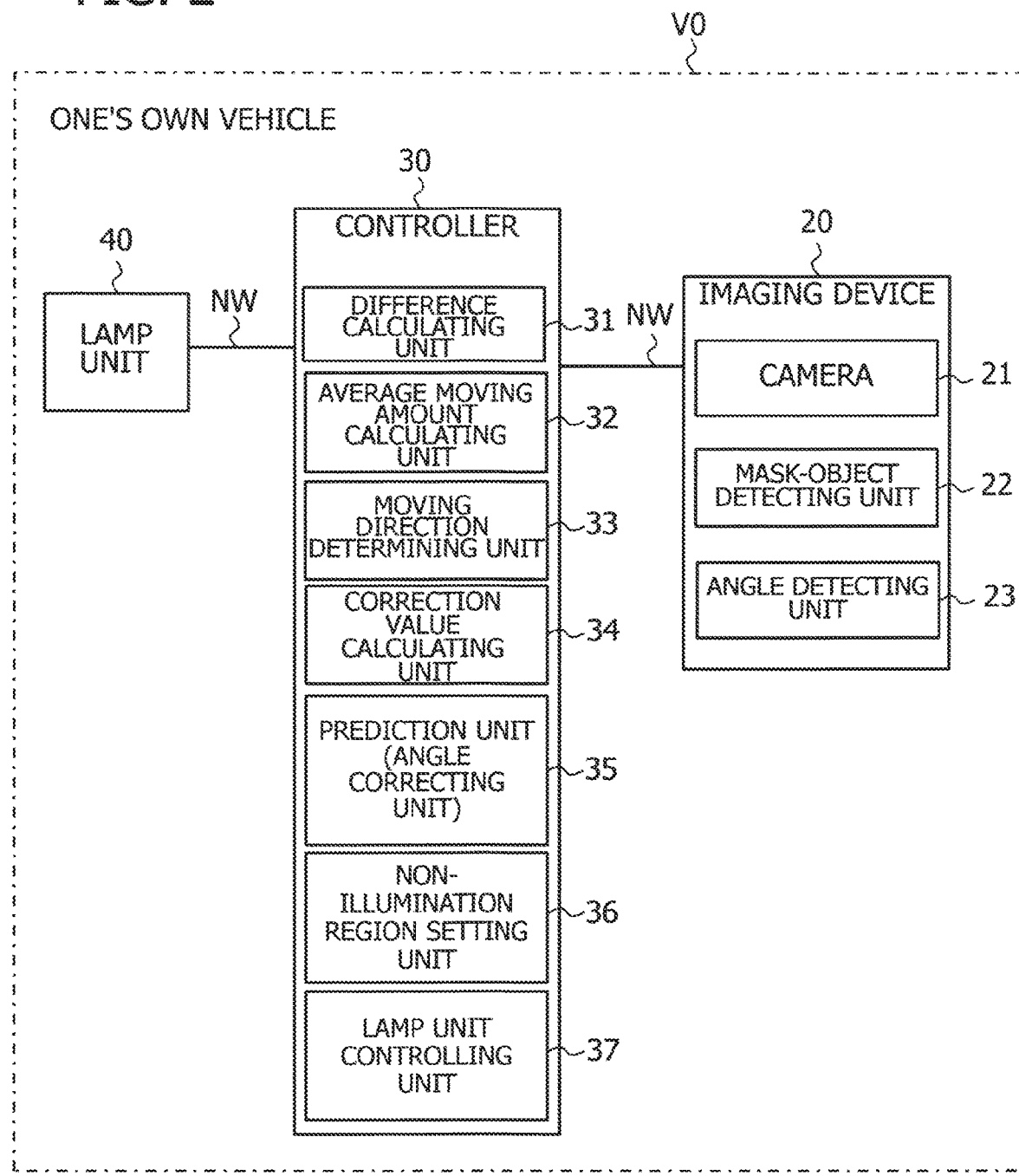
FIG. 2 is a schematic configuration diagram of the vehicle lamp 10.

FIG. 2 is a schematic configuration diagram of the vehicle lamp 10.

As shown in FIG. 2, the vehicle lamp 10 includes an imaging device 20, a controller 30, a lamp unit 40, etc.

The imaging device 20 and the lamp unit 40 are connected to the controller 30 via an in-vehicle network NW. In accordance with a predetermined protocol, the imaging device 20 and the lamp unit 40 communicate with the controller 30 via the in-vehicle network NW. An example of such a predetermined protocol is a controller area network (CAN).

The imaging device 20 includes a camera 21 that captures an image ahead of the self-vehicle V0. The camera 21 is an imaging element such as a CCD sensor or a CMOS sensor. The camera 21 captures an image ahead of the self-vehicle V0 periodically (every 60 ms, for example). The imaging device 20 is provided at the center of the front end of the self-vehicle V0 in a vehicle width direction, for example (see FIGS. 3 and 6). While not shown in the figure, the imaging device 20 includes a CPU, a RAM, and a ROM. The imaging device 20 functions as a mask-object detecting unit 22 and an angle detecting unit 23 when the CPU executes a predetermined program loaded into the RAM from the ROM. Note that the CPU, the RAM, and the ROM included in the imaging device 20 may alternatively be provided external to the imaging device 20.

The mask-object detecting unit 22 (mask-object detecting means) detects a mask-object to be masked ahead of the self-vehicle V0. More specifically, on the basis of an image (image data) captured by the imaging device 20, the mask-object detecting unit 22 detects a mask-object which is included in the image and is present ahead of the self-vehicle V0. Examples of such a mask-object detected by the mask-object detecting unit 22 include a preceding vehicle V1 traveling ahead of the self-vehicle V0 on the vehicle V1's own lane, and an oncoming vehicle V2 traveling ahead of the self-vehicle V0 on an oncoming lane.

The angle detecting unit 23 (angle detecting means) detects angles (a right angle and a left angle) of the mask-object with respect to the self-vehicle V0 as a position (positional information) of the mask-object detected by the mask-object detecting unit 22. Hereinafter, the right angle and the left angle of the mask-object detected by the mask-object detecting unit 22 with respect to the self-vehicle V0 are referred to simply as the right angle and the left angle of the mask-object.

Figure 3:
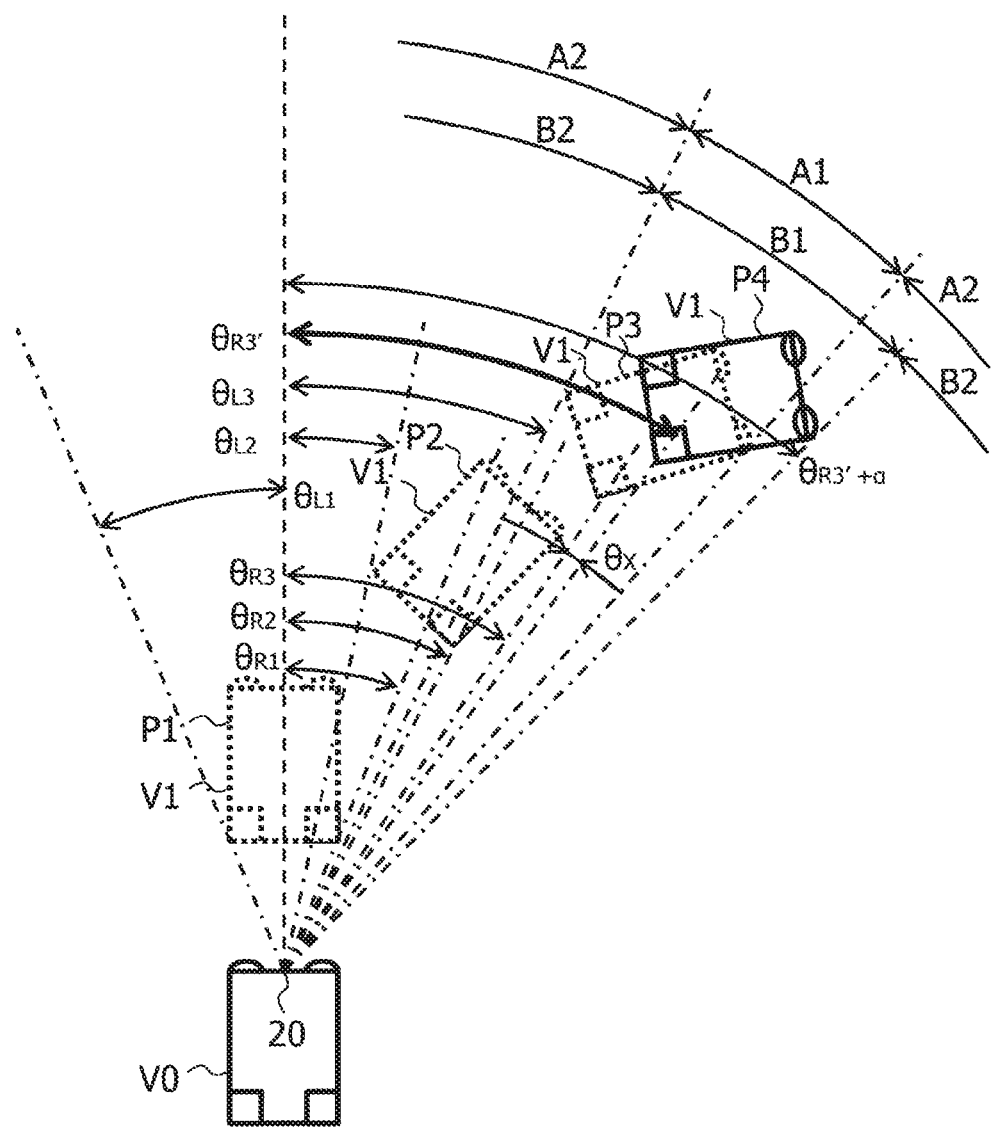
FIG. 3 shows an example of right and left angles of the preceding vehicle V1.

FIG. 3 shows an example of right and left angles of the preceding vehicle V1 which is a mask-object. FIG. 3 shows an example of right and left angles of the preceding vehicle V1 detected when the preceding vehicle V1 turns right.

As shown in FIG. 3, when the preceding vehicle V1 which is a mask-object and positioned at a position P1 is detected by the mask-object detecting unit 22, the angle detecting unit 23 detects a right angle $\theta_{R1}$ and a left angle $\theta_{L1}$ of the preceding vehicle V1 with tail lamps of the preceding vehicle V1 being used as a reference, for example. Similarly, when the preceding vehicle V1 which is a mask-object and positioned at position P2, P3 is detected by the object detecting unit 22, the angle detecting unit 23 detects right angle $\theta_{R2}$, $\theta_{R3}$ and left angle $\theta_{L2}$, $\theta_{L3}$ of the preceding vehicle V1 on the basis of the position and size of a light source (e.g., a tail lamp) present in the image, for example.

Figure 6:
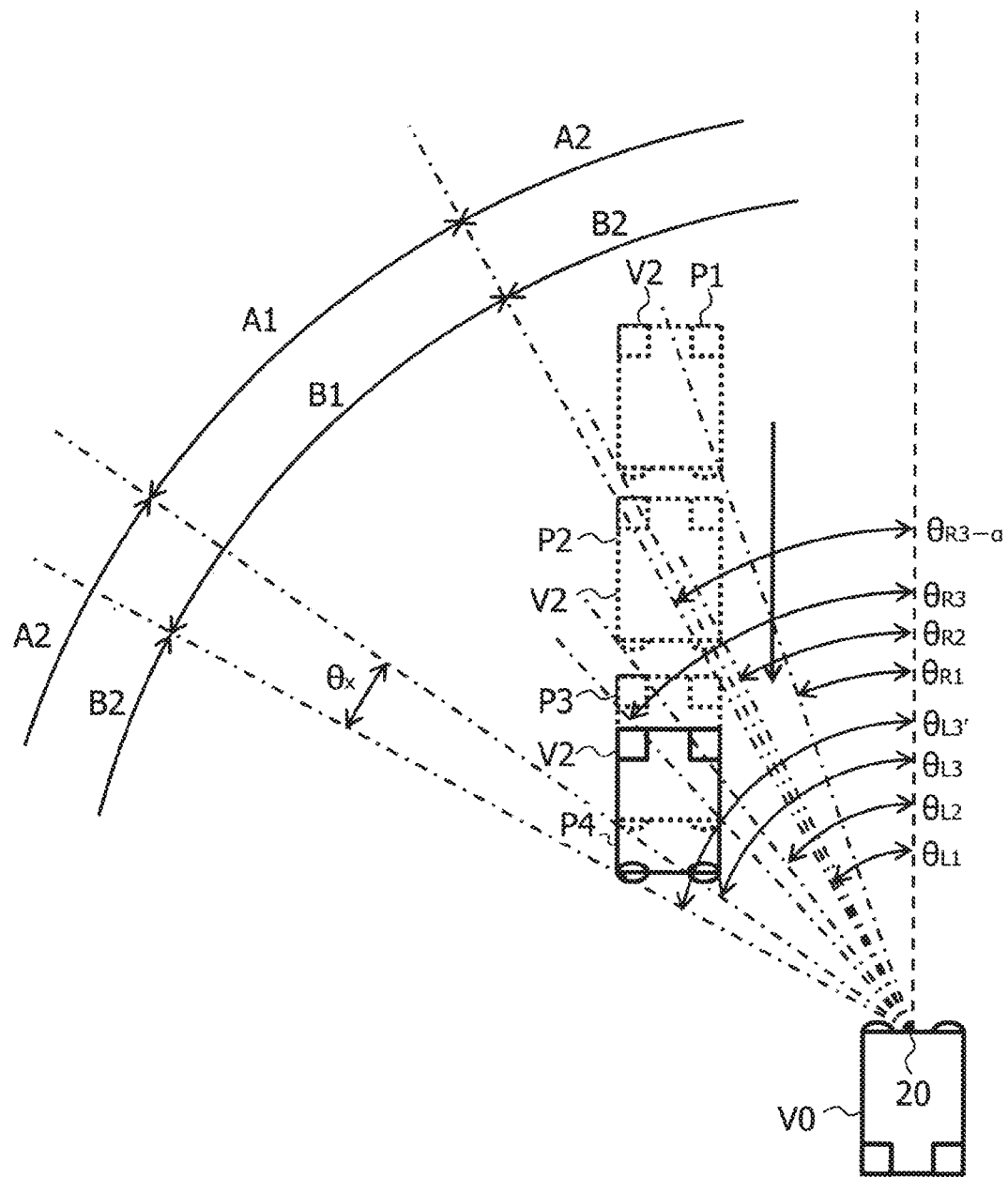
FIG. 6 shows an example of right and left angles of the oncoming vehicle V2.

FIG. 6 shows an example of right and left angles of the oncoming vehicle V2 which is a mask-object. FIG. 6 shows an example of right and left angles of the oncoming vehicle V2 detected when the oncoming vehicle V2 approaches the self-vehicle V0.

As shown in FIG. 6, when the oncoming vehicle V2 which is a mask-object and positioned at a position P1 is detected by the mask-object detecting unit 22, the angle detecting unit 23 detects a right angle $\theta_{R1}$ and a left angle $\theta_{L1}$ of the oncoming vehicle V2 with headlamps of the oncoming vehicle V2 being used as a reference, for example. Similarly, when the oncoming vehicle V2 which is a mask-object and positioned at position P2, P3 is detected by the mask-object detecting unit 22, the angle detecting unit 23 detects right angle $\theta_{R2}$, $\theta_{R3}$ and left angle $\theta_{L2}$, $\theta_{L3}$ of the oncoming vehicle V2.

In an adaptive driving beam vehicle lamp, a certain amount of time (hereinafter referred to as a predetermined time T) is generally required to detect the position of a mask-object, transmit the detected position of the mask-object via the in-vehicle network, set a non-illumination region on the basis of the transmitted position of the mask-object, etc. For example, an amount of time required to detect the position of the mask-object is 200 ms, an amount of time required to transmit the detected position of the mask-object via the in-vehicle network is 100 ms, and an amount of time required to set the non-illumination region on the basis of the transmitted position of the mask-object is 50 ms.

Thus, when the relative position of the mask-object to the self-vehicle V0 rapidly changes, as in the case where the preceding vehicle V1 which is a mask-object rapidly turns (turns right or left) as shown in FIG. 3 or the oncoming vehicle V2 which is a mask-object rapidly approaches the self-vehicle V0 as shown in FIG. 6, the mask-object disadvantageously enters the illumination region beyond the set non-illumination region, thereby being exposed to glare.

For example, it is assumed that the preceding vehicle V1 positioned at the position P3 shown in FIG. 3 is detected as a mask-object; a non-illumination region (see an angular range A1 in FIG. 3) that does not illuminate the preceding vehicle V1 positioned at the position P3 is set; and a light distribution pattern including the set non-illumination region (see the angular range A1 in FIG. 3) and an illumination region (see an angular range A2 in FIG. 3) that illuminates a region other than the non-illumination region is formed in a high-beam region.

In this case, when the preceding vehicle V1 which is a mask-object rapidly turns (turns right, for example) and thus moves from the position P3 in FIG. 3 to a position P4, the preceding vehicle V1 disadvantageously enters the illumination region (see the angular range A2 in FIG. 3) beyond the set non-illumination region (see the angular range A1 in FIG. 3), thereby being exposed to glare.

A similar problem occurs also when the oncoming vehicle V2 positioned at the position P3 shown in FIG. 6 is detected as a mask-object; a non-illumination region (see an angular range A1 in FIG. 6) that does not illuminate the oncoming vehicle V2 positioned at the position P3 is set; and a light distribution pattern including the set non-illumination region (see the angular range A1 in FIG. 6) and a illumination region (see an angular range A2 in FIG. 6) that illuminates a region other than the non-illumination region is formed in a high-beam region.

In view of the aforementioned circumstances, the position of the mask-object after the lapse of the predetermined time T (see, the position P4 in FIGS. 3 and 6, for example) is predicted in the present embodiment.

Thereafter, a non-illumination region (see an angular range B1 in FIGS. 3 and 6, for example) that does not illuminate the mask-object positioned at the predicted position (see the position P4 in FIGS. 3 and 6, for example) is set, and a light distribution pattern including the set non-illumination region (see the angular range B1 in FIGS. 3 and 6, for example) and a illumination region (see an angular range B2 in FIGS. 3 and 6, for example) that illuminates a region other than the non-illumination region is formed in a high-beam region.

This enables glare to the mask-object to be suppressed even when the preceding vehicle V1 which is a mask-object rapidly turns (turns right or left) and thus moves from the position P3 to the position P4 as shown in FIG. 3, or when the oncoming vehicle V2 which is a mask-object rapidly moves from the position P3 to the position P4 as shown in FIG. 6.

A configuration for predicting the position of the mask-object after the lapse of the predetermined time T will be described next.

While not shown in the figures, the controller 30 is, for example, an ECU including a CPU, a RAM, and a ROM. As shown in FIG. 2, the controller 30 functions as a difference calculating unit 31, an average moving amount calculating unit 32, a moving direction determining unit 33, a correction value calculating unit 34, a prediction unit (angle correcting unit) 35, a non-illumination region setting unit 36, and a lamp unit controlling unit 37 when the CPU executes a predetermined program loaded into the RAM from the ROM.

When the mask-object detected by the mask-object detecting unit 22 is the preceding vehicle V1, the moving direction determining unit 33 (moving direction determining means) determines the moving direction of the preceding vehicle V1 (whether the vehicle turns right or left, for example). More specifically, the moving direction determining unit 33 determines the moving direction of the preceding vehicle V1 on the basis of the right and left angles of the preceding vehicle V1 detected by the angle detecting unit 23.

The difference calculating unit 31 (difference calculating means) calculates a difference between the angles detected by the angle detecting unit 23. More specifically, the difference calculating unit 31 calculates a difference in a larger one of the right and left angles detected by the angle detecting unit 23.

When the mask-object detected by the mask-object detecting unit 22 is the preceding vehicle V1 turning right, for example, the difference calculating unit 31 calculates a difference in the right angle of the preceding vehicle V1. When the mask-object detected by the mask-object detecting unit 22 is the preceding vehicle V1 turning left, on the other hand, the difference calculating unit 31 calculates a difference in the left angle of the preceding vehicle V1. In particular, when the mask-object detected by the mask-object detecting unit 22 is the preceding vehicle V1 turning right and the right angles $\theta_{R1}$, $\theta_{R2}$, $\theta_{R3}$, ... of the preceding vehicle V1 are detected by the angle detecting unit 23 as shown in FIG. 3, the difference calculating unit 31 calculates a difference between $\theta_{R1}$ and $\theta_{R2}$, a difference between $\theta_{R2}$ and $\theta_{R3}$, .... The same applies also to the case where the mask-object detected by the mask-object detecting unit 22 is the preceding vehicle V1 turning left and the left angles $\theta_{L1}$, $\theta_{L2}$, $\theta_{L3}$, ... of the preceding vehicle V1 are detected by the angle detecting unit 23.

When the mask-object detected by the mask-object detecting unit 22 is the oncoming vehicle V2 in the case of the right-hand traffic as shown in FIG. 6, the difference calculating unit 31 calculates a difference in the left angle of the oncoming vehicle V2. When the mask-object detected by the mask-object detecting unit 22 is the oncoming vehicle V2 in the case of the left-hand traffic (this case is not illustrated in the figures), on the other hand, the difference calculating unit 31 calculates a difference in the right angle of the oncoming vehicle V2.

Note that a difference may be set to 0 if the difference is greater than or equal to a given value (e.g., 150 degrees). When a difference between $\theta_{R1}$ and $\theta_{R2}$ is greater than or equal to the given value, for example, the difference between $\theta_{R1}$ and $\theta_{R2}$ may be set to 0. This enable a value with an excessively large change (a difference exceeding the given value) for an interval of angular calculation to be treated as a false detection.

The average moving amount calculating unit 32 (average moving amount calculating means) calculates, on the basis of the differences calculated by the difference calculating unit 31, an average moving amount of the mask-object detected by the mask-object detecting unit 22. More specifically, when N differences are calculated by the difference calculating unit 31 (every time N differences are calculated), the average moving amount calculating unit 32 divides the sum of the N differences by N to calculate an average moving amount $\theta_A$ of the mask-object per unit time. When 10 differences (N=10) as a sum are calculated every 60 ms during a period of 600 ms, for example, the average moving amount calculating unit 32 divides the sum of 10 differences by N=10 to calculate the average moving amount $\theta_A$ of the mask-object per unit time (60 ms). N is a predefined numerical value and stored, for example, in a storage unit such as the ROM (not shown) of the controller 30. Note that N is not limited to 10 but may be any number greater than or equal to 2.

The correction value calculating unit 34 (correction value calculating means) calculates a moving amount $\theta_X$ (correction value) of the mask-object after the lapse of the predetermined time T. More specifically, the correction value calculating unit 34 calculates the moving amount $\theta_X$ (correction value) of the mask-object after the lapse of the predetermined time T by multiplying the average moving amount $\theta_A$ of the mask-object per unit time, having been calculated by the average moving amount calculating unit 32, by a coefficient F. Note that the coefficient F is equal to the predetermined time T/60 (when the unit time is equal to 60 ms), for example. The coefficient F is, for example, calculated in advance and stored in the storage unit such as the ROM (not shown) of the controller 30. Note that the coefficient F does not need to be exactly identical with the predetermined time T/60 but may be different from the predetermined time T/60. By manipulating the coefficient F, for example, the position of the mask-object at a later point in time can be predicted.

Note that a moving amount $\theta_X$ (correction value) calculated by the correction value calculating unit 34 may be set to 0 degrees when the moving amount $\theta_X$ (correction value) is smaller than or equal to 0 degrees (that is, since a moving amount with a negative value is generally inconceivable, such a value is regarded as a result of a false detection).

The prediction unit (angle correcting unit) 35 (prediction means) predicts the position of the mask-object, having been detected by the mask-object detecting unit 22, after the lapse of the predetermined time T. More specifically, the prediction unit (angle correcting unit) 35 adds the angle detected by the angle detecting unit 23 and the moving amount $\theta_X$ (correction value) calculated by the correction value calculating unit 34 to calculate a corrected angle representing the position (predicted position) of the mask-object after the lapse of the predetermined time T. In particular, the angle correcting unit 35 adds a larger one of the right and left angles detected by the angle detecting unit 23 and the moving amount $\theta_X$ (correction value) calculated by the correction value calculating unit 34 to calculate a corrected angle representing the position (predicted position) of the mask-object after the lapse of the predetermined time T.

For example, when the mask-object detected by the mask-object detecting unit 22 is the preceding vehicle V1 turning right as shown in FIG. 3, the prediction unit (angle correcting unit) 35 adds the right angle $\theta_{R3}$ and the moving amount $\theta_X$ (correction value), for example, to calculate a corrected right angle $\theta_{R3'}$ representing the position (the position P4 in FIG. 3) of the preceding vehicle V1 after the lapse of the predetermined time T. When the mask-object detected by the mask-object detecting unit 22 is the preceding vehicle V1 turning left (this case is not illustrated in the figures), on the other hand, the prediction unit (angle correcting unit) 35 adds the left angle $\theta_{L3}$ and the moving amount $\theta_X$ (correction value), for example, to calculate a corrected left angle $\theta_{L3'}$ representing the position of the preceding vehicle V1 after the lapse of the predetermined time T.

When the mask-object detected by the mask-object detecting unit 22 is the oncoming vehicle V2 (in the case of the right-hand traffic) as shown in FIG. 6, the prediction unit (angle correcting unit) 35 adds the left angle $\theta_{L3}$ and the moving amount $\theta_X$ (correction value), for example, to calculate a corrected left angle $\theta_{L3'}$ representing the position (the position P4 in FIG. 6) of the oncoming vehicle V2 after the lapse of the predetermined time T. When the mask-object detected by the mask-object detecting unit 22 is the oncoming vehicle V2 (in the case of the left-hand traffic) (this case is not illustrated in the figures), on the other hand, the prediction unit (angle correcting unit) 35 adds the right angle $\theta_{R3}$ and the moving amount $\theta_X$ (correction value) to calculate a corrected right angle $\theta_{R3'}$ representing the position of the oncoming vehicle V2 after the lapse of the predetermined time T.

Note that a corrected angle (e.g., a corrected right angle) calculated by the prediction unit (angle correcting unit) 35 may be set to 25 degrees if the corrected angle (e.g., the corrected right angle) exceeds 25 degrees. Since the range of the light-distribution pattern is within 25 degrees on the left and right sides, the purpose of this is to correct the calculation result so as to fall within the range of the light distribution pattern.

On the basis of the position (predicted position) predicted by the prediction unit (angle correcting unit) 35, the non-illumination region setting unit 36 (non-illumination region setting means) sets an non-illumination region that does not illuminate the mask-object positioned at the predicted position.

For example, it is assumed that the corrected right angle $\theta_{R3'}$ (see FIG. 3) has been predicted by the prediction unit (angle correcting unit) 35 as the position of the preceding vehicle V1, which is a mask-object, after the lapse of the predetermined time T.

In this case, the non-illumination region setting unit 36 sets, for example, the angular range B1 between the corrected right angle $\theta_{R3'}+\alpha$ and the left angle $\theta_{L3}$ as a non-illumination region. For example, $\alpha$ is a predefined value.

The lamp unit controlling unit 37 controls the lamp unit 40 to form, in a high-beam region, a light distribution pattern including the non-illumination region (e.g., the angular range B1 in FIG. 3) set by the non-illumination region setting unit 36 and a illumination region (e.g., the angular range B2 in FIG. 3) that illuminates a region other than the non-illumination region.

The lamp unit 40 may be any adaptive driving beam lamp unit capable of forming, in a high-beam region, a light distribution pattern including a non-illumination region that does not illuminate a mask-object and an illumination region that illuminates a region other than the non-illumination region in accordance with the control by the controller 30 (the lamp unit controlling unit 37). Such a lamp unit 40 may have any configuration.

For example, the lamp unit 40 may be a lamp unit including a micro electro mechanical system (MEMS), a lamp unit including a digital mirror device (DMD), a direct projection lamp unit including a plurality of light sources arranged in a horizontal direction or in a matrix, or a lamp unit having any other configuration.

As examples of such a lamp unit including MEMS and such a lamp unit including a DMD, those described in Japanese Patent Application Laid-Open No. 2017-206094, for example, may be employed. As an example of such a direct projection lamp unit including a plurality of light sources arranged in a horizontal direction, the lamp unit described in Japanese Patent Application Laid-Open No. 2009-218155, for example, may be employed. As an example of such a direct projection lamp unit including a plurality of light sources arranged in a matrix, the lamp unit described in Japanese Patent Application Laid-Open No. 2009-218211, for example, may be employed.

As described in Japanese Patent Application Laid-Open No. 2008-037240, the lamp unit 40 may be configured by a plurality of lamp units, each of which illuminates (or does not illuminate) a corresponding one of a plurality of irradiated regions arranged in the horizontal direction in a high-beam region.

Exemplary operations of the vehicle lamp 10 having the above-described configuration will be described next.

Figure 4:
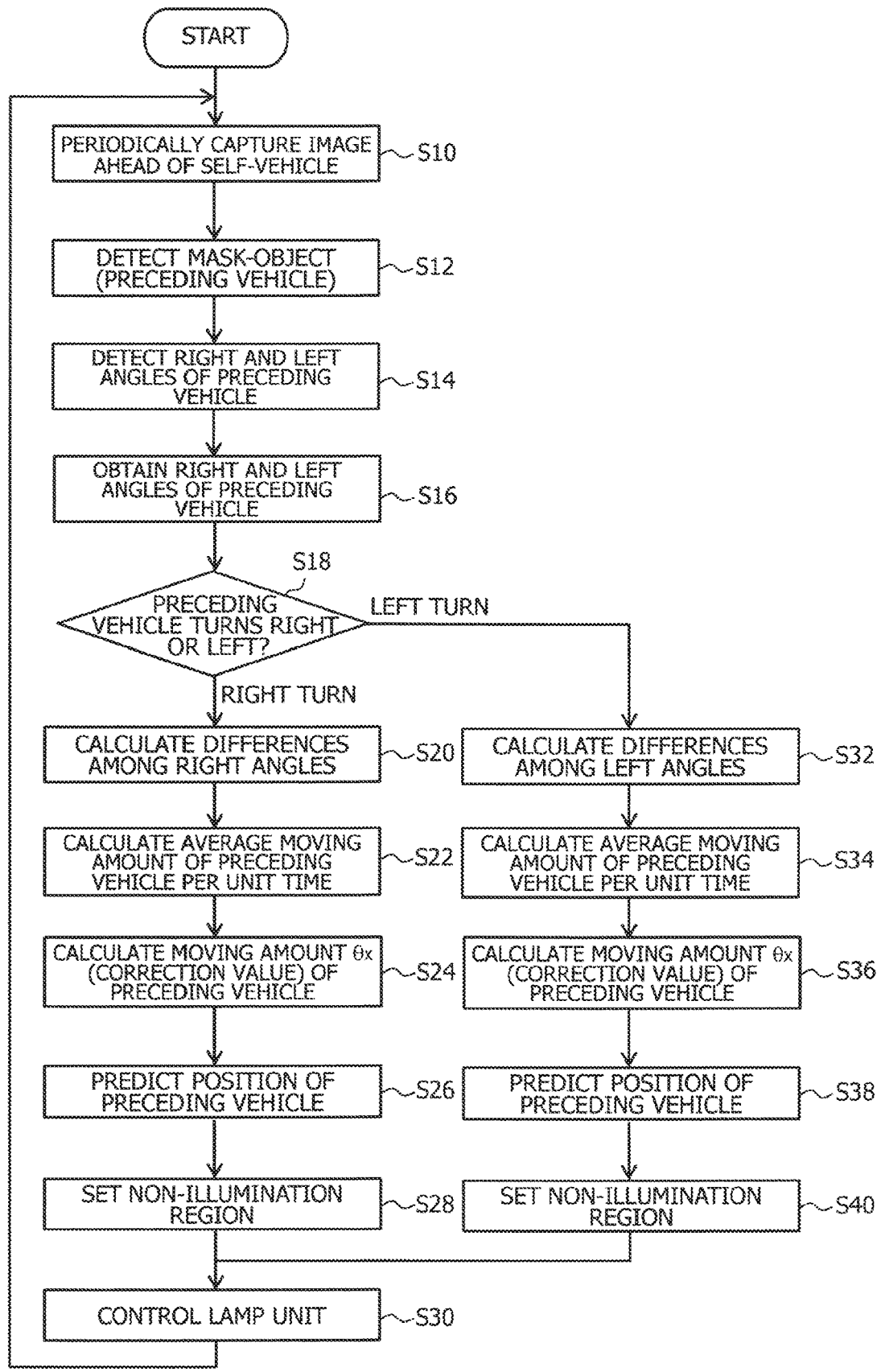
FIG. 4 is a flow chart for describing the exemplary operations of the vehicle lamp 10.

FIG. 4 is a flow chart for describing the exemplary operations of the vehicle lamp 10.

Exemplary operations when the mask-object detected by the mask-object detecting unit 22 is the preceding vehicle V1 rapidly turning right as shown in FIG. 3 will be described below.

First, the imaging device 20 captures an image ahead of the self-vehicle V0 (step S10).

On the basis of the image (image data) captured in the step S10, the mask-object detecting unit 22 then detects a mask-object which is included in the image and is present ahead of the self-vehicle V0 (step S12). Here, it is assumed that the preceding vehicle V1 has been detected as a mask-object.

The angle detecting unit 23 then detects the right and left angles of the preceding vehicle V1 detected in the step S12 (step S14).

The aforementioned steps S10 to S14 are executed periodically (every 60 ms, for example). Here, it is assumed that the right angles $\theta_{R1}$ to $\theta_{R3}$ and the left angles $\theta_{L1}$ to $\theta_{L3}$ of the preceding vehicle V1 have been detected as shown in FIG. 3 as a result of the periodic execution of the aforementioned steps S10 to S14. The detected right angles $\theta_{R1}$ to $\theta_{R3}$ and left angles $\theta_{L1}$ to $\theta_{L3}$ are transmitted to the controller 30 via the in-vehicle network NW.

The controller 30 then obtains (receives) the right angles $\theta_{R1}$ to $\theta_{R3}$ and the left angles $\theta_{L1}$ to $\theta_{L3}$ transmitted via the in-vehicle network NW (step S16).

On the basis of the right and left angles of the preceding vehicle V1 obtained in the step S16 (e.g., the right angles $\theta_{R1}$ to $\theta_{R3}$ and the left angles $\theta_{L1}$ to $\theta_{L3}$), the moving direction determining unit 33 then determines the moving direction of the preceding vehicle V1 (step S18). Processes (steps S20 to S30) to be performed when it is determined that the moving direction of the preceding vehicle V1 corresponds to a right turn (the step S18: right turn) will be described below. Note that processes (steps S32 to S40) to be performed when it is determined that the moving direction of the preceding vehicle V1 corresponds to a left turn (the step S18: left turn) are similar to the steps S20 to S30 and the description thereof is therefore omitted.

When the determination result of a right turn is obtained in the step S18 (the step S18: right turn), the difference calculating unit 31 calculates a difference in a larger one of the right and left angles obtained in the step S16, i.e., differences among the right angles (the step S20). When the right angles $\theta_{R1}$ to $\theta_{R3}$ and the left angles $\theta_{L1}$ to $\theta_{L3}$ are obtained in the step S16, for example, the difference calculating unit 31 calculates a difference between $\theta_{R1}$ and $\theta_{R2}$, a difference between $\theta_{R2}$ and $\theta_{R3}$, . . . . Here, it is assumed that 2 differences (N=2) as a sum including the difference between $\theta_{R1}$ and $\theta_{R2}$ and the difference between $\theta_{R2}$ and $\theta_{R3}$ have been detected.

When N differences are calculated in the step S20 (every time N differences are calculated), the average moving amount calculating unit 32 then divides the sum of the N differences by N to calculate an average moving amount $\theta_A$ of the preceding vehicle V1 per unit time (step S22).

The correction value calculating unit 34 then calculates a moving amount $\theta_X$ (correction value) of the preceding vehicle V1 after the lapse of the predetermined time T by multiplying the average moving amount $\theta_A$ of the preceding vehicle V1 per unit time, having been calculated in the step S22, by a coefficient F (step S24).

The prediction unit (angle correcting unit) 35 then predicts the position of the preceding vehicle V1, having been detected by the mask-object detecting unit 22, after the lapse of the predetermined time T (step S26). For example, the prediction unit (angle correcting unit) 35 adds the right angle $\theta_{R3}$ and the moving amount $\theta_X$ (correction value) to calculate a corrected right angle $\theta_{R3'}$ representing the position (e.g., the position P4 in FIG. 3) of the preceding vehicle V1 after the lapse of the predetermined time T.

On the basis of the position (predicted position) predicted in the step S26, the non-illumination region setting unit 36 then sets a non-illumination region that does not illuminate the preceding vehicle V1 positioned at the predicted position (step S28). For example, the non-illumination region setting unit 36 sets the angular range B1 (see FIG. 3) between the corrected right angle $\theta_{R3'}$+a and the left angle $\theta_{L3}$ as the non-illumination region.

Note that determination means that determines whether the average moving amount $\theta_A$ of the preceding vehicle V1 (a change in the relative position of the mask-object) calculated in the step S22 exceeds a threshold may be provided. In this case, if the average moving amount $\theta_A$ of the preceding vehicle V1 exceeds the threshold, the non-illumination region setting unit 36 may set, on the basis of the position (predicted position) predicted in the step S26, a non-illumination region that does not illuminate the preceding vehicle V1 positioned at the predicted position. If the average moving amount $\theta_A$ of the preceding vehicle V1 does not exceed the threshold, on the other hand, the non-illumination region setting unit 36 may set, on the basis of the position detected in the step S14, an non-illumination region that does not illuminate the preceding vehicle V1 positioned at such a position as with the conventional techniques.

This enable the process (step S24) of calculating the moving amount ox (correction value) of the preceding vehicle V1 and the process (step S26) of predicting the position of the preceding vehicle V1 to be omitted, when the average moving amount $\theta_A$ of the preceding vehicle V1 calculated in the step S22 does not exceed the threshold.

The lamp unit controlling unit 37 then controls the lamp unit 40 to form, in a high-beam region, a light distribution pattern including the non-illumination region (e.g., the angular range B1 in FIG. 3) set in the step S28 and an illumination region (e.g., the angular range B2 in FIG. 3) that illuminates a region other than the non-illumination region (the step S30).

In accordance with the control by the controller 30 (the lamp unit controlling unit 37), the lamp unit 40 forms, in the high-beam region, the light distribution pattern including the non-illumination region (e.g., the angular range B1 in FIG. 3) set in the step S28 and the illumination region (e.g., the angular range B2 in FIG. 3) that illuminates a region other than the non-illumination region.

As described above, the position of the preceding vehicle V1 after the lapse of the predetermined time T is predicted (the step S26) according to the present exemplary operations.

Thereafter, the non-illumination region (see the angular range B1 in FIG. 3, for example) that does not illuminate the preceding vehicle V1 positioned at the predicted position (see the position P4 in FIG. 3, for example) is set (the step S28). The light distribution pattern including the set non-illumination region (see the angular range B1 in FIG. 3, for example) and the illumination region (see the angular range B2 in FIG. 3, for example) that illuminates a region other than the non-illumination region is then formed in the high-beam region (the step S30).

This enables glare to the preceding vehicle V1 to be suppressed even when the preceding vehicle V1 which is a mask-object rapidly turns (e.g., turns right) to rapidly change the relative position of the preceding vehicle V1 to the self-vehicle V0 (even when the preceding vehicle V1 rapidly moves from the position P3 to the position P4 in FIG. 3, for example).

Other exemplary operations of the vehicle lamp 10 having the above-described configuration will be described next.

Figure 5:
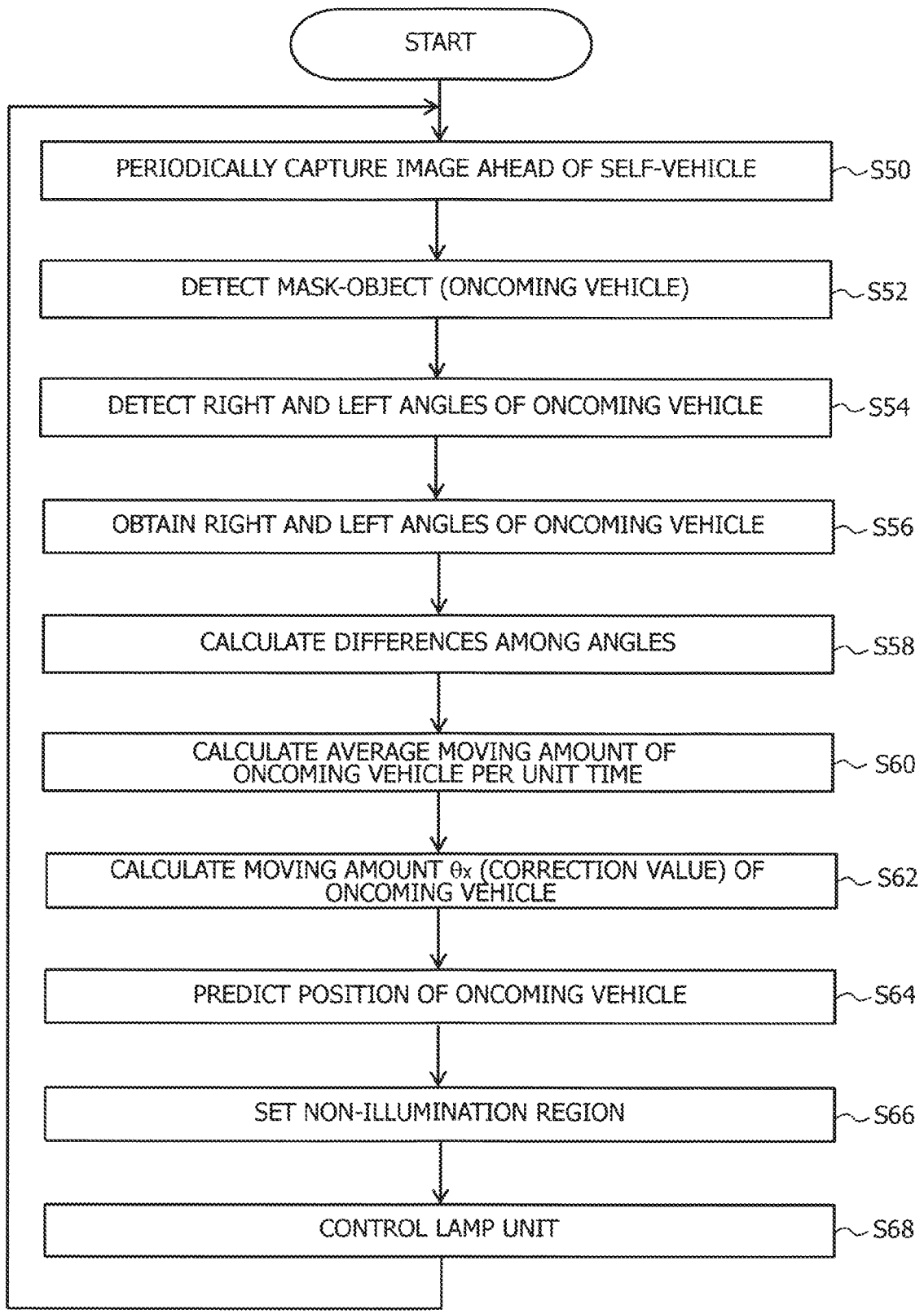
FIG. 5 is a flow chart for describing the other exemplary operations of the vehicle lamp 10.

FIG. 5 is a flow chart for describing the other exemplary operations of the vehicle lamp 10.

Exemplary operations when the mask-object detected by the mask-object detecting unit 22 is the oncoming vehicle V2 rapidly approaching the self-vehicle V0 as shown in FIG. 6 will be described below. While processes in the case of the right-hand traffic will be described below, the same applies also to the left-hand traffic.

First, the imaging device 20 captures an image ahead of the self-vehicle V0 (step S50).

On the basis of the image (image data) captured in the step S50, the mask-object detecting unit 22 then detects a mask-object which is included in the image and is present ahead of the self-vehicle V0 (step S52). Here, it is assumed that the oncoming vehicle V2 has been detected as a mask-object.

The angle detecting unit 23 then detects the right and left angles of the oncoming vehicle V2 detected in the step S52 (step S54).

The aforementioned steps S50 to S54 are executed periodically (every 60 ms, for example). Here, it is assumed that the right angles $\theta_{R1}$ to $\theta_{R3}$ and the left angles $\theta_{L1}$ to $\theta_{L3}$ of the oncoming vehicle V2 have been detected as shown in FIG. 6 as a result of the periodic execution of the aforementioned steps S50 to S54. The detected right angles $\theta_{R1}$ to $\theta_{R3}$ and left angles $\theta_{L1}$ to $\theta_{L3}$ are transmitted to the controller 30 via the in-vehicle network NW.

The controller 30 then obtains (receives) the right angles $\theta_{R1}$ to $\theta_{R3}$ and the left angles $\theta_{L1}$ to $\theta_{L3}$ transmitted via the in-vehicle network NW (step S56).

The difference calculating unit 31 then calculates a difference in a larger one of the right and left angles obtained in the step S56, i.e., differences among the left angles in this case (step S58). When the right angles $\theta_{R1}$ to $\theta_{R3}$ and the left angles $\theta_{L1}$ to $\theta_{L3}$ are obtained in the step S56, for example, the difference calculating unit 31 calculates a difference between $\theta_{L1}$ and $\theta_{L2}$, a difference between $\theta_{L2}$ and $\theta_{L3}$, . . . . Here, it is assumed that 2 differences (N=2) as a sum including the difference between $\theta_{L1}$ and $\theta_{L2}$ and the difference between $\theta_{L2}$ and $\theta_{L3}$ have been detected.

When N differences are calculated in the step S58 (every time N differences are calculated), the average moving amount calculating unit 32 then divides the sum of the N differences by N to calculate an average moving amount $\theta_A$ of the oncoming vehicle V2 per unit time (step S60).

The correction value calculating unit 34 then calculates a moving amount $\theta_X$ (correction value) of the oncoming vehicle V2 after the lapse of the predetermined time T by multiplying the average moving amount $\theta_A$ of the oncoming vehicle V2 per unit time, having been calculated in the step S60, by a coefficient F (step S62).

The prediction unit (angle correcting unit) 35 then predicts the position of the oncoming vehicle V2, having been detected by the mask-object detecting unit 22, after the lapse of the predetermined time T (step 64). For example, the prediction unit (angle correcting unit) 35 adds the left angle $\theta_{L3}$ and the moving amount $\theta_X$ (correction value) to calculate a corrected left angle $\theta_{L3'}$ representing the position (e.g., the position P4 in FIG. 6) of the oncoming vehicle V2 after the lapse of the predetermined time T.

On the basis of the position (predicted position) predicted in the step S64, the non-illumination region setting unit 36 then sets a non-illumination region that does not illuminate the oncoming vehicle V2 positioned at the predicted position (step S66). For example, the non-illumination region setting unit 36 sets the angular range B1 (see FIG. 6) between the corrected left angle $\theta_{L3'}$ and the right angle $\theta_{R3}-\alpha$ as the non-illumination region.

Note that determination means that determines whether the average moving amount $\theta_A$ of the oncoming vehicle V2 (a change in the relative position of the mask-object) calculated in the step S60 exceeds a threshold may be provided. In this case, if the average moving amount $\theta_A$ of the oncoming vehicle V2 exceeds the threshold, the non-illumination region setting unit 36 may set, on the basis of the position (predicted position) predicted in the step S64, a non-illumination region that does not illuminate the oncoming vehicle V2 positioned at the predicted position. If the average moving amount $\theta_A$ of the oncoming vehicle V2 does not exceed the threshold, on the other hand, the non-illumination region setting unit 36 may set, on the basis of the position detected in the step S54, an non-illumination region that does not illuminate the oncoming vehicle V2 positioned at such a position as with the conventional techniques.

This enable the process (step S62) of calculating the moving amount ex (correction value) of the oncoming vehicle V2 and the process (step S64) of predicting the position of the oncoming vehicle V2 to be omitted, when the average moving amount $\theta_A$ of the oncoming vehicle V2 calculated in the step S60 does not exceed the threshold.

The lamp unit controlling unit 37 then controls the lamp unit 40 to form, in a high-beam region, a light distribution pattern including the non-illumination region (e.g., the angular range B1 in FIG. 6) set in the step S66 and an illumination region (e.g., the angular range B2 in FIG. 6) that illuminates a region other than the non-illumination region (step S68).

In accordance with the control by the controller 30 (the lamp unit controlling unit 37), the lamp unit 40 forms, in the high-beam region, the light distribution pattern including the non-illumination region (e.g., the angular range B1 in FIG.

6) set in the step S66 and the illumination region (e.g., the angular range B2 in FIG. 6) that illuminates a region other than the non-illumination region.

As described above, the position of the oncoming vehicle V2 after the lapse of the predetermined time T is predicted (the step S64) according to the present exemplary operations.

Thereafter, the non-illumination region (see the angular range B1 in FIG. 6) that does not illuminate the oncoming vehicle V2 positioned at the predicted position (see the position P4 in FIG. 6, for example) is set (the step S66). The light distribution pattern including the set non-illumination region (see the angular range B1 in FIG. 6) and the illumination region (see the angular range B2 in FIG. 6) that illuminates a region other than the non-illumination region is then formed in the high-beam region (the step S68).

This enables glare to the preceding vehicle V1 to be suppressed even when the oncoming vehicle V2 which is a mask-object rapidly approaches the self-vehicle V0 to rapidly change the relative position of the oncoming vehicle V2 to the self-vehicle V0 (even when the oncoming vehicle V2 rapidly moves from the position P3 to the position P4 in FIG. 6, for example).

As described above, according to the embodiments, glare to the mask-object can be suppressed even when the relative position of the mask-object to the self-vehicle V0 rapidly changes as in the case where the preceding vehicle V1 which is a mask-object rapidly turns (turns right or left) or the oncoming vehicle V2 which is a mask-object rapidly approaches the self-vehicle V0.

This can be achieved by predicting the position of a mask-object after the lapse of the predetermined time T (the step S26 or S64), setting a non-illumination region that does not illuminate the mask-object positioned at the predicted position (the step S28 or S66), and forming, in a high-beam region, a light distribution pattern including the set non-illumination region and an illumination region that illuminates a region other than the non-illumination region (the step S30 or S68).

Modifications will be described next.

In the description of the above embodiments, when N differences are calculated (every time the N differences are calculated) by the difference calculating unit 31, the average moving amount calculating unit 32 calculates, in the step S22 (or the step S60), an average moving amount $\theta_A$ of the preceding vehicle V1 (or the oncoming vehicle V2) per unit time by dividing the sum of the N differences by N. Thereafter, the processes in the steps S24 to S30 (or the steps S62 to S68) are executed. The present invention, however, is not limited thereto.

For example, when differences the number of which is less than N are calculated (every time the differences the number of which is less than N are calculated) by the difference calculating unit 31, the average moving amount calculating unit 32 may calculate an average moving amount $\theta_A$ of the mask-object per unit time by dividing the sum of the differences the number of which is less than N by N in the step S22 (or the step S60). Thereafter, the processes in the steps S24 to S30 (or the steps S62 to S68) may be executed.

This enables non-illumination region to be gradually enlarged. As a result, a feeling of visual strangeness caused by sudden enlargement of the non-illumination region can be suppressed.

While the examples using the imaging device 20 have been described in the above-described embodiments, the present invention is not limited thereto. For example, a radar device (e.g., a millimeter-wave radar or an infrared laser radar) may be substituted for the imaging device 20.

While the examples in which the object to be masked (mask-object) is either the preceding vehicle V1 or the oncoming vehicle V2 have been described in the above-described embodiments, the present invention is not limited thereto. The object to be masked (mask-object) may be a pedestrian or a bicycle, for example.

The respective numerical values presented in the respective embodiments described above are by way of example only and, obviously, different appropriate numerical values can be used.

The respective embodiments described above are to be considered in all respects as illustrative and not restrictive. The present invention is not to be taken in a limited sense based on the description of the respective embodiments presented above. The present invention may be embodied in various other forms without departing from the spirit or primary characteristics thereof.

The invention claimed is:

1. A vehicle lamp comprising:
   mask-object detecting means that detects a mask-object to be masked ahead of a self-vehicle;
   prediction means that predicts a position of the mask-object detected by the mask-object detecting means;
   a lamp unit that forms, a light distribution pattern including a non-illumination region that does not illuminate the mask-object positioned at the position predicted by the prediction means,
   non-illumination region setting means that sets, on a basis of the position predicted by the prediction means, the non-illumination region;
   lamp unit controlling means that controls the lamp unit;
   angle detecting means that detects an angle of the mask-object detected by the mask-object detecting means with respect to the self-vehicle;
   difference calculating means that calculates a difference between angles detected by the angle detecting means;
   average moving amount calculating means that calculates, on a basis of the difference calculated by the difference calculating means, an average moving amount of the mask-object detected by the mask-object detecting means; and
   correction value calculating means that calculates a correction value by multiplying the average moving amount of the mask-object calculated by the average moving amount calculating means, by a coefficient, wherein
   the position of the mask-object predicted by the prediction means is a position of the mask-object after a lapse of a predetermined time,
   the lamp unit controlling means controls the lamp unit to form, the light distribution pattern including the non-illumination region set by the non-illumination region setting means,
   the prediction means predicts, on a basis of the angle detected by the angle detecting means the position of the mask-object detected by the mask-object detecting means and the prediction means adds the angle detected by the angle detecting means and the correction value calculated by the correction value calculating means to predict the position of the object detected by the mask-object detecting means.

2. The vehicle lamp according to claim 1, wherein
the angle detecting means detects an angle on the right side and an angle on the left side of the mask-object detected by the mask-object detecting means with respect to the self-vehicle;
the difference calculating means calculates a difference in a larger one of the right angle and the left angle detected by the angle detecting means; and
the prediction means adds the larger one of the right angle and the left angle detected by the angle detecting means and the correction value calculated by the correction value calculating means to predict the position of the object detected by the mask-object detecting means.

3. The vehicle lamp according to claim 1, wherein, when N differences are calculated by the difference calculating means, the average moving amount calculating means divides a sum of the N differences by the N to calculate the average moving amount of the mask-object.

4. The vehicle lamp according to claim 1, wherein, when differences the number of which is less than N are calculated by the difference calculating means, the average moving amount calculating means divides a sum of the differences, the number of which is less than N, by the N to calculate the average moving amount of the mask-object.

5. The vehicle lamp according to claim 1, wherein
when a change in relative position of the mask-object detected by the mask-object detecting means to the self-vehicle exceeds a threshold, the non-illumination region setting means sets the non-illumination region that does not illuminate the mask-object positioned at the position predicted by the prediction means, and
when a change in relative position of the mask-object detected by the mask-object detecting means to self-vehicle does not exceed the threshold, the non-illumination region setting means sets the non-illumination region that does not illuminate the mask-object positioned at the position detected by the angle detecting means.

6. The vehicle lamp according to claim 2, wherein
the mask-object is the preceding vehicle,
the angle on the right side of the preceding vehicle with respect to the self-vehicle is detected with tail lamps on the right side of the preceding vehicle being used as a reference, and
the angle on the left side of the preceding vehicle with respect to the self-vehicle is detected with tail lamps on the left side of the preceding vehicle being used as a reference.

7. The vehicle lamp according to claim 6, further comprising:
moving direction determining means that determines a moving direction of the preceding vehicle, wherein
the moving direction determining means determines the moving direction of the preceding vehicle on the basis of the angle on the right side and the angle on the right side of the preceding vehicle detected by the angle detecting means.

8. The vehicle lamp according to claim 6, wherein
when the mask-object detected by the mask-object detecting means is the preceding vehicle turning right, the difference calculating means calculates a difference in the angle on the right side of the preceding vehicle, and
when the mask-object detected by the mask-object detecting means is the preceding vehicle turning left, the difference calculating means calculates a difference in the angle on the left side of the preceding vehicle.

9. The vehicle lamp according to claim 6, wherein
when the mask-object is the preceding vehicle turning right, the prediction means adds the angle on the right side detected by the angle detecting means and correction value calculated by the correction value calculating means to predict position of the mask-object, detected by the mask-object detecting means, after the lapse of the predetermined time, and
when the mask-object is the preceding vehicle turning left, the prediction means adds the angle on the left side detected by the angle detecting means and correction value calculated by the correction value calculating means to predict position of the mask-object, detected by the mask-object detecting means, after the lapse of the predetermined time.

10. The vehicle lamp according to claim 6, wherein
when the mask-object is the preceding vehicle turning right, the non-illumination region setting means sets the angular range between an angle obtained by adding a predefined numerical value to the angle on the right side predicted by the prediction means and the angle on the left side detected by the angle detecting means as the non-illumination region, and
when the mask-object is the preceding vehicle turning left, the non-illumination region setting means sets the angular range between an angle obtained by adding a predefined numerical value to the angle on the left side predicted by the prediction means and the angle on the right side detected by the angle detecting means as the non-illumination region.

11. The vehicle lamp according to claim 2, wherein
the mask-object is the oncoming vehicle,
the angle on the right side of the oncoming vehicle with respect to the self-vehicle is detected with headlamps on the right side of the oncoming vehicle being used as a reference, and
the angle on the left side of the oncoming vehicle with respect to the self-vehicle is detected with headlamps on the left side of the oncoming vehicle being used as a reference.

12. The vehicle lamp according to claim 11, wherein
when the mask-object is the oncoming vehicle traveling on the right-hand traffic, the prediction means adds the angle on the left side detected by the angle detecting means and correction value calculated by the correction value calculating means to predict position of the mask-object, detected by the mask-object detecting means, after the lapse of the predetermined time, and
when the mask-object is the oncoming vehicle traveling on the left-hand traffic, the prediction means adds the angle on the right side detected by the angle detecting means and correction value calculated by the correction value calculating means to predict position of the mask-object, detected by the mask-object detecting means, after the lapse of the predetermined time.

13. The vehicle lamp according to claim 11, wherein
when the mask-object is the oncoming vehicle traveling on the right-hand traffic, the non-illumination region setting means sets the angular range between the angle on the left side predicted by the prediction means and an angle obtained by subtracting a predefined numerical value from the angle on the right side detected by the angle detecting means as the non-illumination region, and
when the mask-object is the oncoming vehicle traveling on the left-hand traffic, the non-illumination region setting means sets the angular range between the angle on the right side predicted by the prediction means and an angle obtained by subtracting a predefined numerical value from the angle on the left side detected by the angle detecting means as the non-illumination region.

\* \* \* \* \*